E. G. RATHMANN.
HANDLE ATTACHMENT FOR AUTOMOBILES.
APPLICATION FILED FEB. 19, 1914.
1,135,615.
Patented Apr. 13, 1915.
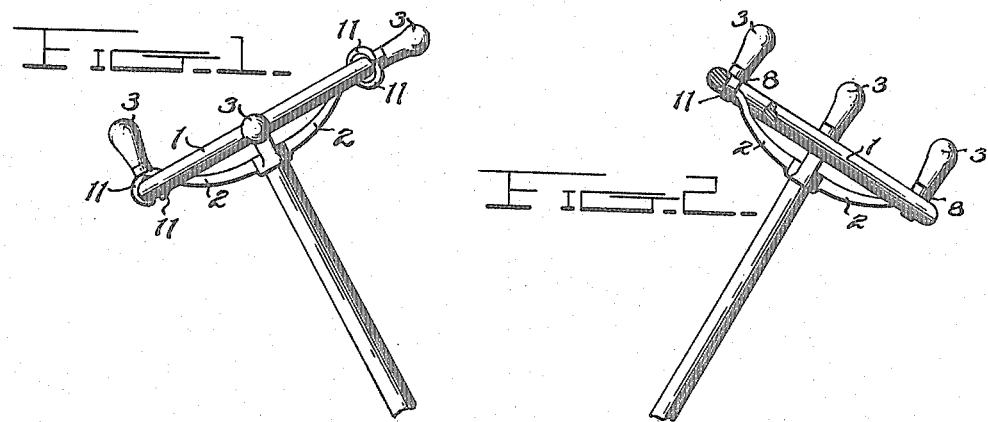
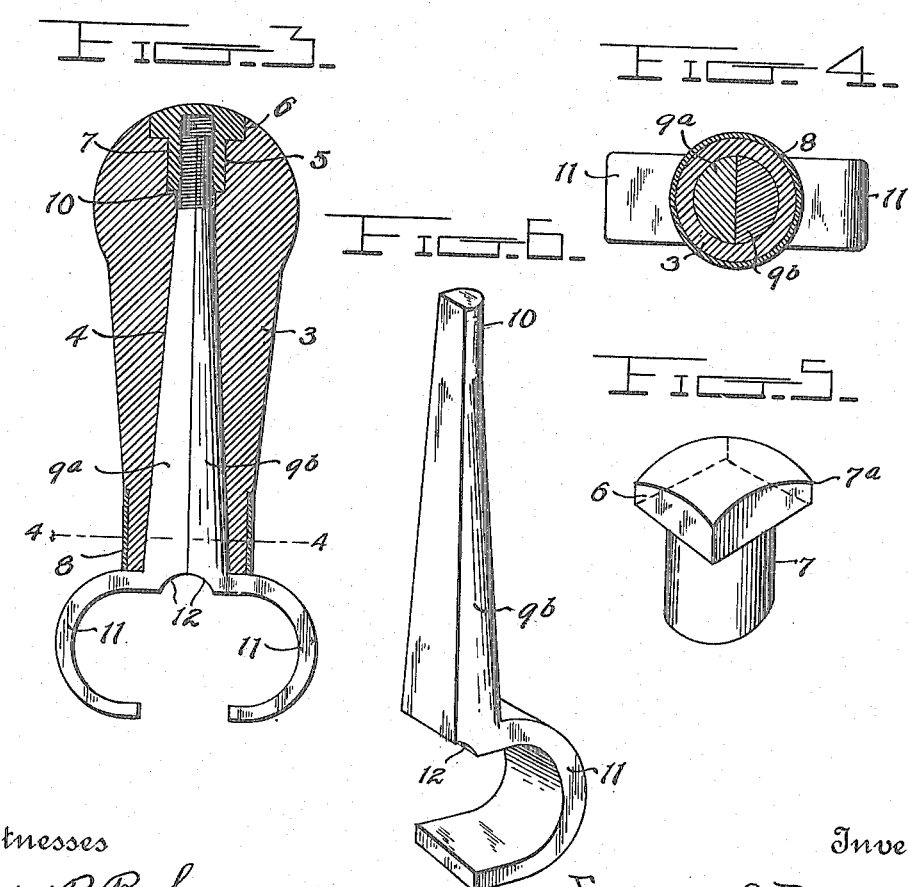
Witnesses
Harry B. Rook.
G. M. Copenhaver.
Inventor
Edward G. Rathmann
By H. S. Hile
Attorney

UNITED STATES PATENT OFFICE.

EDWARD G. RATHMANN, OF DELTA, OHIO.

HANDLE ATTACHMENT FOR AUTOMOBILES.

1,135,615.  Specification of Letters Patent.  Patented Apr. 13, 1915.

Application filed February 19, 1914. Serial No. 819,687.

*To all whom it may concern:*

Be it known that I, EDWARD G. RATHMANN, citizen of the United States, residing at Delta, in the county of Fulton and State of Ohio, have invented certain new and useful Improvements in Handle Attachments for Automobiles, of which the following is a specification.

The present invention relates to a detachable handle for the steering wheels of automobiles and the like, the object of the invention being to provide a device of this character which can be readily applied to a steering wheel and clamped in position at any desired angle, thereby enabling a firm grip to be obtained thereon and eliminating all danger of the steering wheel slipping in the hands and causing an accident.

A further object of the invention is to provide a detachable handle of this character which is simple and inexpensive in its construction, which can be readily placed in position or removed therefrom, and which does not interfere in any manner with the operation of the steering wheel.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a side elevation of a steering wheel having a number of the detachable handles applied to the periphery thereof. Fig. 2 is a similar view of a steering wheel having a number of the detachable handles applied to the spokes thereof, a portion of the rim of the wheel being broken away. Fig. 3 is an enlarged longitudinal sectional view through one of the detachable handles. Fig. 4 is a transverse sectional view on the line 4—4 of Fig. 3. Fig. 5 is a detail perspective view of the nut. Fig. 6 is a detail perspective view of one of the clamping elements.

Corresponding and like parts are referred to in the following description and indicated in all the views of the drawing by the same reference characters.

For the purpose of illustration, in Fig. 1 the detachable handles are shown as applied to the periphery 1 of an ordinary steering wheel, while in Fig. 2 they are shown as applied to the spokes 2 of the steering wheel. These detachable handles can be applied to the steering wheel at any desired point, and clamped in position at any desired angle, as may be found most convenient for the operator.

Specifically describing the detailed construction of the attachment, the numeral 3 designates the body portion of the handle which is formed with a longitudinal opening 4. This opening 4 is preferably circular in cross section and gradually tapers in size from the inner end of the handle toward the outer end thereof. At the outer end of the handle the reduced end of the tapered opening 4 communicates with a cylindrical enlargement 5 and a polygonal seat 6. A nut 7 is fitted within the cylindrical enlargement 5, the head 7$^a$ of the nut having a polygonal formation and being received within the polygonal seat 6 at the outer end of the handle so as to be locked with the handle and caused to rotate therewith. The inner end of the handle 3 is surrounded by a reinforcing band 8 which prevents the handle from splitting when the clamping elements are drawn tightly within the same. A tapered stem is fitted within the tapered opening 4 of the handle, the said stem being divided longitudinally to provide the two complemental wedge sections 9$^a$ and 9$^b$. The outer end of the tapered stem is substantially cylindrical and threaded as indicated at 10 so as to engage the threaded portion of the nut 7. The larger end or base of each of the complemental wedge sections 9$^a$ and 9$^b$ is provided with a curved arm or claw 11, the said claws projecting beyond the handle and being adapted to coöperate with each other to grip a member interposed between the same, such as the periphery or spokes of a steering wheel.

In the operation of the device, the two wedge members 9$^a$ and 9$^b$ are removed from the handle 3 and the curved claws 11 thereof caused to engage opposite sides of that portion of the steering wheel to which it is desired to apply the handle. After the two wedge shaped members 9$^a$ and 9$^b$ are thus properly positioned, the handle 3 is fitted over the same and the nut 7 caused to engage the threaded cylindrical end 10 of the wedge shaped members. The handle 3 is then rotated so as to screw the nut 7 upon the threaded portion 10 and this results in forcibly drawing the wedge shaped members into the handle. As the wedge members are thus drawn into position, the inclined outer sides thereof coöperate with the inclined faces of the tapered opening 4 to bring the bases of the wedge members together and draw the claws 11 into a firm engagement with the steering wheel. In a reverse manner the handle can be readily detached from the steering wheel by first rotating the handle to unscrew the nut 7 from the threaded portion 10 of the wedge members and then slipping the handle away from the wedge members.

In Fig. 1 one of the handles 3 is shown as projecting outwardly from the steering wheel, while the other handles project radially therefrom. It will be obvious that the handles may be applied to the steering wheel in that position which is deemed most advantageous by the user. Steering wheel rims are usually rather flat in cross section, and in order to admit of the handles being applied to the rim at different angles, the claw ends of the wedge sections $9^a$ and $9^b$ preferably have the inner corners thereof cut away at 12 for coöperation with each other to provide a concaved seat adapted to receive the edge of the steering wheel rim 1 when the handle is applied thereto in a radial position.

As will be apparent from an inspection of Fig. 3, the claws 11 are shaped to fit around the edges of the flattened steering wheel rim when the handle 3 projects outwardly therefrom, although when the handle projects radially from the steering wheel rim 1, the edge of the latter is seated within the notches 12.

Having thus described the invention, what I claim as new and desire to secure by Letters Patent, is:—

1. The herein described detachable handle for steering wheels, including a handle member formed with a longitudinal opening extending entirely through the same and having a tapered formation, a correspondingly tapered shank extending through the opening of the handle member and divided longitudinally to form a pair of complemental wedge sections adapted to be assembled from opposite sides and forced tightly together when drawn into the tapered opening of the handle member, coöperating steering wheel engaging claws integral with the larger ends of the wedge sections and projecting beyond one end of the handle member, and a nut engaging the smaller end of the tapered shank for forcibly drawing the same through the tapered opening of the handle member to hold the claws in operative engagement with a portion of the steering wheel placed between the same.

2. The herein described detachable handle for steering wheels or like members of a flattened cross section, including a handle member formed with a tapered opening, a correspondingly tapered shank fitted within the opening and divided longitudinally to form a pair of complemental wedge sections, coöperating claws formed in connection with the wedge sections and shaped to engage the edges of a member of flattened cross section when it is desired to apply the handle thereto in one position, the adjacent corners of the claw ends of the wedge sections being correspondingly cut away to provide a seat for engagement with an edge of the member of flattened cross section when it is desired to apply the handle thereto in another position, and means for drawing the tapered shank forcibly within the tapered opening to move the wedge sections and coöperating claws toward each other.

In testimony whereof I affix my signature in presence of two witnesses.

EDWARD G. RATHMANN.

Witnesses:
I. V. WILLIAMS,
R. S. SNYDER.